United States Patent
Li et al.

(10) Patent No.: US 11,726,968 B2
(45) Date of Patent: Aug. 15, 2023

(54) METHODS, APPARATUSES, AND DEVICES FOR TRANSFERRING DATA ASSETS BASED ON BLOCKCHAIN

(71) Applicant: ALIPAY (HANGZHOU) INFORMATION TECHNOLOGY CO., LTD., Zhejiang (CN)

(72) Inventors: Shubo Li, Hangzhou (CN); Wenyu Yang, Hangzhou (CN); Shanlu Sun, Hangzhou (CN); Ping Dai, Hangzhou (CN); Renhui Yang, Hangzhou (CN); Qin Liu, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/358,249

(22) Filed: Jun. 25, 2021

(65) Prior Publication Data

US 2021/0318996 A1   Oct. 14, 2021

(30) Foreign Application Priority Data

Sep. 15, 2020 (CN) .......................... 202010969238.0

(51) Int. Cl.
*G06F 16/21* (2019.01)
*G06F 16/23* (2019.01)
*G06F 21/62* (2013.01)

(52) U.S. Cl.
CPC ........ *G06F 16/211* (2019.01); *G06F 16/2315* (2019.01); *G06F 21/6218* (2013.01)

(58) Field of Classification Search
CPC ................................................. H04L 2209/38
See application file for complete search history.

(56) References Cited

U.S. PATENT DOCUMENTS 10,505,741 B1   12/2019   Conley
2018/0254898 A1* 9/2018   Sprague .................... H04L 9/30
(Continued)

FOREIGN PATENT DOCUMENTS

CN   1996955   7/2007
CN   103677935   3/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mohammad S Rostami
(74) *Attorney, Agent, or Firm* — Fish & Richardson P.C.

(57) ABSTRACT

Embodiments of the present specification disclose methods, apparatuses, and devices for transferring data assets based on a blockchain. One method includes: obtaining usage demand information of a data requestor for using original data, wherein the usage demand information indicates a demand of the data requestor for performing computations based on the original data; sending a usage authorization request for the original data to a data owner of the original data based on a decentralized identifier (DID) corresponding to the original data; receiving confirmation information of the usage authorization request from the data owner; processing the original data based on the usage demand information to obtain a processing result; transmitting the processing result to the data requestor; and generating a verifiable claim (VC) for recording usage information of the original data.

16 Claims, 5 Drawing Sheets

(56) References Cited

U.S. PATENT DOCUMENTS

| | | | | |
|---|---|---|---|---|
| 2019/0230092 | A1* | 7/2019 | Patel | H04L 9/0869 |
| 2019/0305949 | A1* | 10/2019 | Hamel | H04L 9/3226 |
| 2019/0319939 | A1* | 10/2019 | Hamel | H04L 63/0807 |
| 2020/0034888 | A1* | 1/2020 | Soundararajan | G06Q 20/065 |
| 2020/0034945 | A1* | 1/2020 | Soundararajan | G06T 1/0021 |
| 2020/0036707 | A1* | 1/2020 | Callahan | H04L 9/3231 |
| 2020/0127828 | A1* | 4/2020 | Liu | H04L 9/0637 |
| 2020/0296102 | A1* | 9/2020 | Buchner | H04L 63/0884 |
| 2020/0304560 | A1* | 9/2020 | Buchner | H04L 12/1822 |
| 2020/0387619 | A1* | 12/2020 | Murdoch | G06F 21/604 |
| 2020/0401734 | A1* | 12/2020 | Murdoch | H04L 9/0863 |
| 2021/0011905 | A1* | 1/2021 | Uhr | H04L 9/0637 |
| 2021/0036866 | A1* | 2/2021 | Zolfonoon | H04L 67/20 |
| 2021/0058400 | A1* | 2/2021 | Murdoch | H04L 63/102 |
| 2021/0058403 | A1* | 2/2021 | Murdoch | H04L 9/3239 |
| 2021/0218742 | A1* | 7/2021 | Cook | H04L 9/3239 |
| 2021/0273931 | A1* | 9/2021 | Murdoch | H04L 9/006 |
| 2021/0281411 | A1* | 9/2021 | Murdoch | H04L 9/3218 |
| 2021/0288974 | A1* | 9/2021 | Murdoch | H04L 9/3239 |
| 2021/0306151 | A1* | 9/2021 | Murdoch | H04L 63/08 |
| 2022/0006651 | A1* | 1/2022 | Soundararajan | H04L 9/3263 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475. filed Jun. 25, 2021, Renhui Yang.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/3 64,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21181530.3, dated Dec. 16, 2021, 8 pages.
Hasan et al., "Proof of Delivery of Digital Assets Using Blockchain and Smart Contracts," IEEE Access, Nov. 2018, 6:65439-65448.
medium.com, [online] "Overview of Decentralized Identity Standards," retrieved on May 16, 2022, retrieved from URL<https://medium.com/decentralized-identity/overview-of-decentralized-identity-standards-f82efd9ab6c7>, 10 pages.

* cited by examiner

METHODS, APPARATUSES, AND DEVICES FOR TRANSFERRING DATA ASSETS BASED ON BLOCKCHAIN

CROSS-REFERENCE TO RELATED APPLICATIONS

This application claims priority to Chinese Patent Application No. 202010969238.0, filed on Sep. 15, 2020, which is hereby incorporated by reference in its entirety.

TECHNICAL FIELD

The present application relates to the field of blockchain technologies, in particular, to methods, apparatuses, and devices for transferring data assets based on a blockchain.

BACKGROUND

Data plays an increasingly important role in the existing technology. For example, diagnostic data in a medical record of a user may be considered as valuable data by medical research institutions, and the medical research institutions are willing to pay the user to purchase the data of the user for study of medical research technologies. It can be seen from the previous example that some data is highly valuable and can be processed as assets.

However, in the existing technology, there is no complete data asset transfer solution available yet.

SUMMARY

Embodiments of the present specification provide methods, apparatuses, and devices for transferring data assets based on a blockchain, to alleviate a problem that security of a data asset transfer process cannot be ensured and the data asset transfer process cannot be recorded in the existing methods for transferring data assets.

To alleviate the previous technical problem, the embodiments of the present specification are implemented as follows:

A method for transferring data assets based on a blockchain provided in the embodiments of the present specification includes the following: usage demand information of a data requestor for original data that serves as data assets is obtained, where the usage demand information is used to indicate a demand of the data requestor for obtaining a result calculated based on the original data; a usage authorization request for the original data is submitted to a data owner of the original data based on a decentralized identifier (DID) corresponding to the original data; after confirmation information of the usage authorization request is received from the data owner, the original data is processed based on the usage demand to obtain processing result data; the processing result data is transmitted to the data requestor; and a verifiable claim (VC) used to record usage information of the original data is generated.

A method for transferring data assets based on a blockchain provided in the embodiments of the present specification includes the following: purchase demand information of a data requestor for original data that serves as data assets is obtained; a selling authorization request for the original data is submitted to a data owner of the original data based on a DID corresponding to the original data; and after confirmation information of the selling authorization request is received from the data owner, a VC that includes ownership information of the original data is generated, where the ownership information is used to indicate that ownership of the original data belongs to the data requestor.

An apparatus for transferring data assets based on a blockchain provided in the embodiments of the present specification includes: a usage demand information acquisition module, configured to obtain usage demand information of a data requestor for original data that serves as data assets, where the usage demand information is used to indicate a demand of the data requestor for obtaining a result calculated based the original data; a usage authorization request submission module, configured to submit a usage authorization request for the original data to a data owner of the original data based on a DID corresponding to the original data; a data processing module, configured to: after confirmation information of the usage authorization request is received from the data owner, process the original data based on the usage demand to obtain processing result data; a processing result data transmission module, configured to transmit the processing result data to the data requestor; and a verifiable claim generation module, configured to generate a VC used to record usage information of the original data.

An apparatus for transferring data assets based on a blockchain provided in the embodiments of the present specification includes: a purchase demand information acquisition module, configured to obtain purchase demand information of a data requestor for original data that serves as data assets; a selling authorization request submission module, configured to submit a selling authorization request for the original data to a data owner of the original data based on a DID corresponding to the original data; and a verifiable claim generation module, configured to: after confirmation information of the selling authorization request is received from the data owner, generate a VC that includes ownership information of the original data, where the ownership information is used to indicate that ownership of the original data belongs to the data requestor.

A device for transferring data assets based on a blockchain provided in the embodiments of the present specification includes: at least one processor; and a memory communicatively coupled to the at least one processor, where the memory stores instructions that can be executed by the at least one processor, and the instructions are executed by the at least one processor to enable the at least one processor to: obtain usage demand information of a data requestor for original data that serves as data assets, where the usage demand information is used to indicate a demand of a data requestor for obtaining a result calculated based on the original data; submit a usage authorization request for the original data to a data owner of the original data based on a DID corresponding to the original data; after receiving confirmation information of the usage authorization request from the data owner, process the original data based on the usage demand to obtain processing result data; transmit the processing result data to the data requestor; and generate a VC used to record usage information of the original data.

A device for transferring data assets based on a blockchain provided in the embodiments of the present specification includes: at least one processor; and a memory communicatively coupled to the at least one processor, where the memory stores instructions that can be executed by the at least one processor, and the instructions are executed by the at least one processor to enable the at least one processor to: obtain purchase demand information of a data requestor for original data that serves as data assets; submit a selling authorization request for the original data to a data owner of the original data based on a DID corresponding to the original data; and after receiving confirmation information of the selling authorization request from the data owner, generate a VC that includes ownership information of the original data, where the ownership information is used to indicate that ownership of the original data belongs to the data requestor.

A computer readable medium provided in the embodiments of the present specification stores computer readable instructions, where the computer readable instructions can be executed by a processor to implement the method for transferring data assets based on a blockchain.

The embodiments of the present specification can achieve the following beneficial effects: The usage demand information of the data requestor for the original data that serves as the data assets is obtained. The usage authorization request for the original data is submitted to the data owner of the original data based on the DID corresponding to the original data. After the confirmation information of the usage authorization request is received from the data owner, the original data is processed based on the usage demand to obtain processing result data. The processing result data is transmitted to the data requestor. The VC used to record usage information of the original data is generated. As such, it can be ensured that when the original data serving as data assets is kept within a domain, transmission usage needs are satisfied, and a usage process of the processing result data obtained by processing the original data can be clearly recorded, thereby ensuring that the data asset transfer process is secure and traceable.

BRIEF DESCRIPTION OF DRAWINGS

To describe technical solutions in embodiments of the present specification or in the existing technology more clearly, the following briefly describes the accompanying drawings needed for describing the embodiments or the existing technology. Clearly, the accompanying drawings in the following descriptions merely show some embodiments of the present specification, and a person of ordinary skill in the art can still derive other drawings from these accompanying drawings without creative efforts.

DESCRIPTION OF EMBODIMENTS

To make the objectives, technical solutions and advantages of embodiments of the present specification clearer, the following clearly and comprehensively describes the technical solutions of the present specification with reference to specific embodiments and accompanying drawings of the present specification. Clearly, the described embodiments are only some rather than all embodiments of the present specification. All other embodiments obtained by a person of ordinary skill in the art based on the one or more embodiment of the present specification without creative efforts shall fall within the protection scope of the present specification.

A blockchain is a technical solution that collectively maintains a reliable database by using decentralization and trustless methods. The blockchain is characterized by decentralization, decentralized storage, encryption, and traceability. Due to use of decentralized computation and storage, there is no centralized hardware or management organization. All nodes are equal in rights and obligations. Data blocks in a system are jointly maintained by a node with a maintenance function in the entire system. Digital currency transactions or other data can be securely stored, and information cannot be forged and tempered with. Transaction confirmation in the blockchain is jointly completed by all nodes in the blockchain.

Due to mechanisms such as a consensus algorithm and an encryption algorithm, the blockchain can effectively manage data asset-type data, for example, copyright data, contract data, and game items. In a data monetization process, data flow from on-chain to off-chain may damage trustworthiness of the assets. The privacy of data assets cannot be guaranteed during transfer, use, and calculation of the assets. In addition, an owner, a user, and usage information of each data asset cannot be clearly recorded in the transfer process. Therefore, how to ensure trusted transfer of data that serves as assets in the network becomes a problem to be alleviated urgently.

The technical solutions of the embodiments of the present specification are described in detail below with reference to the accompanying drawings.

Figure 1:
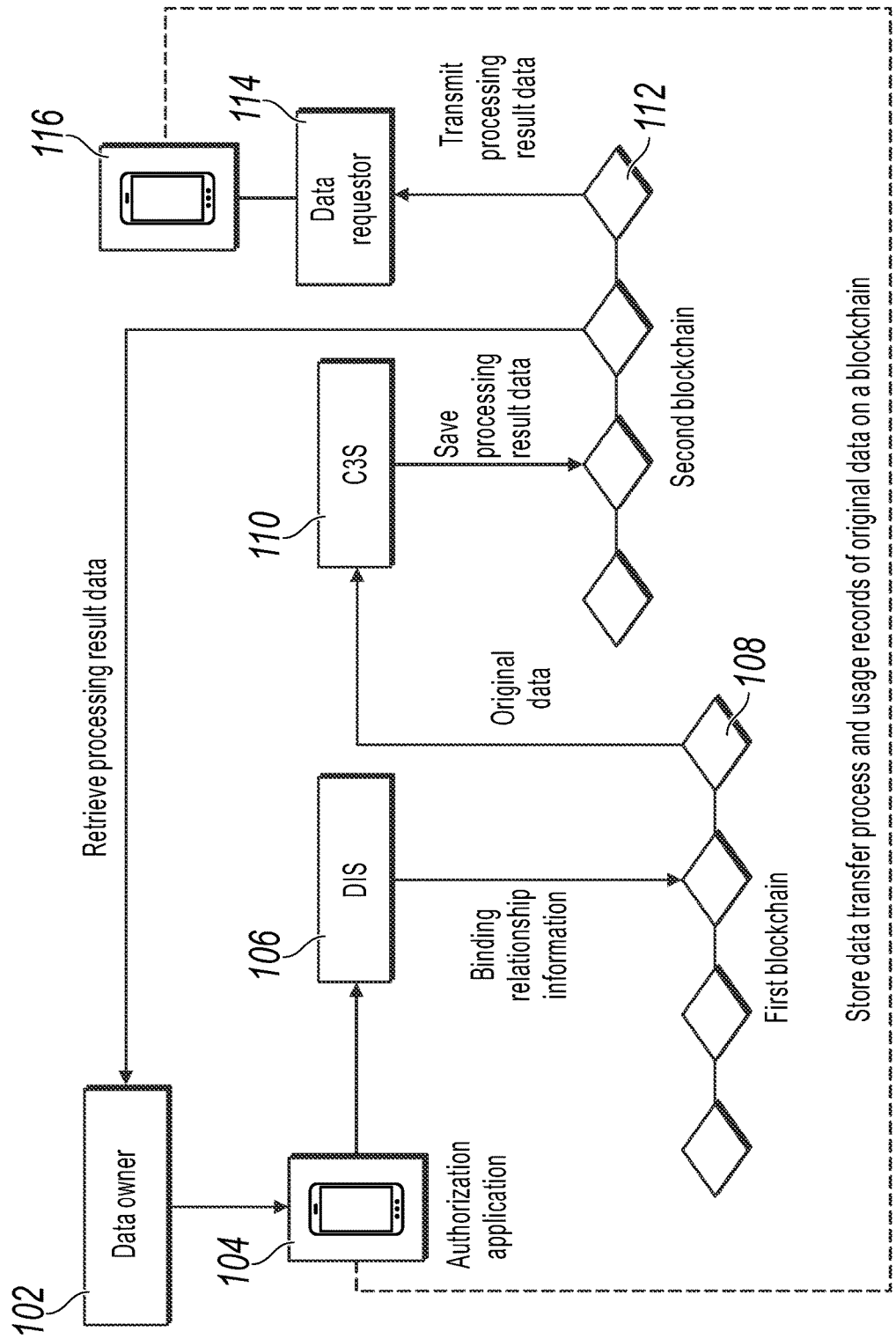
FIG. 1 is a schematic diagram illustrating an overall solution of a method for transferring data assets based on a blockchain, according to some embodiments of the present specification.

FIG. 1 is a schematic diagram illustrating an overall solution of a method for transferring data assets based on a blockchain, according to some embodiments of the present specification. As shown in FIG. 1, a data owner 102 can enter relevant information of original data and relevant information of the data owner through an application interface of an authorization application 104 of the data owner. A decentralized identifier service (DIS) 106 can establish binding relationship information between a decentralized identifier (DID) of the data owner and a data identifier of corresponding original data, and stores the binding relationship information in a first blockchain 108. Here, the first blockchain 108 can be a first blockchain system or a second blockchain system in subsequent embodiments of the present specification. Any blockchain used to store relevant data or a binding relationship can be the first blockchain 108 here. The first blockchain 108 can further store original data, and send, for computing, the original data to a confidential computing cloud service (C3S) 110 responsible for computing, to obtain processing result data. The processing result data is stored in a second blockchain 112, or can be stored in the first blockchain 108. The second blockchain 112 can also be used to transmit the processing result data to a data requestor 114. In addition to the data requestor 114, the processing result data can also be transmitted back to the data owner 102, so that the processing result data can also be served as data assets of the data owner 102. After receiving the processing result data, the data requestor 114 can enter usage information of the processing result data and relevant information of the data requestor 114 through an authorization application 116 of the data requestor. Finally, the entire data transfer process and usage records of the original data need to be stored in the blockchain. In this case, a blockchain for storing the data can be the first blockchain 108, the second blockchain 112, or other blockchains. No specific limitation is imposed here.

Next, the method for transferring data assets based on a blockchain provided in some embodiments of the present specification is described in detail below with reference to the accompanying drawings.

Embodiment 1

Figure 2:
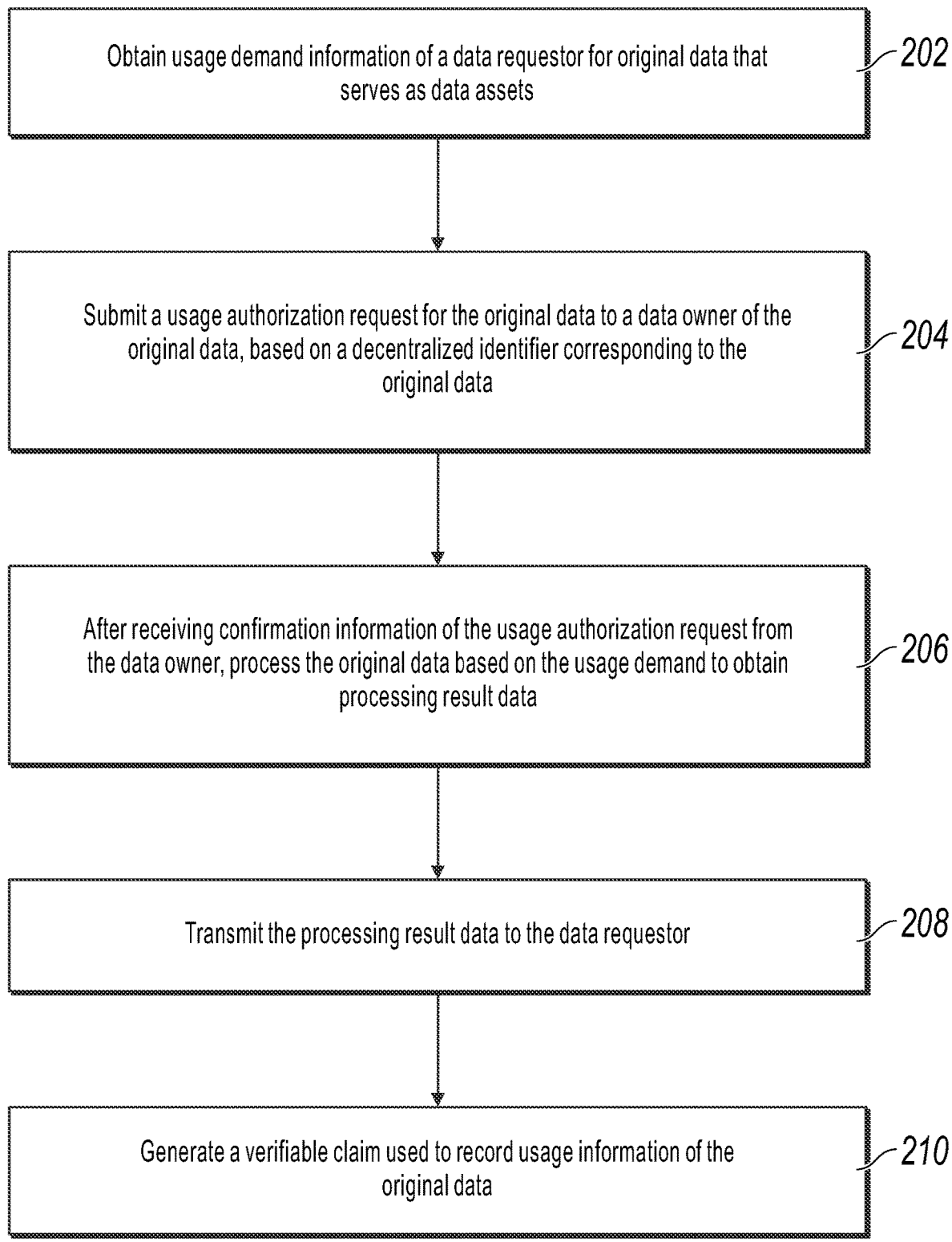
FIG. 2 is a flowchart illustrating a method for transferring data assets based on a blockchain, according to Embodiment 1 of the present specification.

FIG. 2 is a flowchart illustrating a method for transferring data assets based on a blockchain, according to Embodiment 1 of the present specification. In terms of a program, the embodiments of the present specification can be executed by an application service cluster. The server cluster can include one or more application services. These application services can perform data exchange with a blockchain network, or can be deployed on a blockchain. DIS, C3S responsible for computing, etc. can be deployed in the application service cluster. In subsequent embodiments, the execution body is replaced with a "system" for ease of description.

As shown in FIG. 2, the process can include the following steps:

Step 202: Usage demand information of a data requestor for original data that serves as data assets is obtained, where the usage demand information is used to indicate a demand of the data requestor for obtaining a result calculated based on the original data.

The data requestor can be a user who requests to use data. Here, the user can be an individual or an organization such as an enterprise and an institution.

The usage demand information can indicate the demand of the data requestor for obtaining the result calculated based on the original data. The usage demand information can be a piece of request information that includes relevant information of request data. The relevant information of the request data can include a type of processing result data that the user requests to use, a data identifier and a data type of the original data corresponding to the processing result data, etc. In some applications, the usage demand information can also include specific use of the original data that the user requests to use.

The data assets can be digital assets of a common individual or enterprise, for example, the data assets can be various types of data that uses documents as carriers, such as pictures, videos, edited documents, medical record data, and industrial data of the individual. Alternatively, the data assets can be design drawings, contracts, orders, and any data of various services that use documents as carriers of an enterprise.

Step 204: A usage authorization request for the original data is submitted to a data owner of the original data based on a DID corresponding to the original data.

A decentralized identifier (DID) is a digital identity credential implemented based on a decentralized system. DID technologies are usually implemented based on the blockchain system. Fundamental elements constituting a DID include at least a DID and a decentralized identifier document (DID Doc). The DID can be a DID of the data owner of the original data. The original data also has a data identifier, and that the original data and the data owner have a binding relationship can be specifically that the data identifier of the original data and the DID of the data owner have a binding relationship.

Step 206: After confirmation information of the usage authorization request is received from the data owner, the original data is processed based on the usage demand to obtain processing result data.

The usage authorization request transmitted by the system to the data owner can include the usage demand information of the data requestor. The usage authorization request can be transmitted in form of uniform resource locator (URL), that is, a website corresponding to the usage authorization demand transmitted to the data owner, and after the data owner clicks the link of the website to open a corresponding webpage, the webpage can display the usage demand information of the data requestor. An "Agree" or "Reject" button can be configured on the webpage. If the data owner agrees the data requestor to use data, the "Agree" button can be clicked. Certainly, in actual applications, the usage authorization request can be a piece of text confirmation information transmitted to the data owner. The data owner can perform authorization only by replying "Confirmed".

After receiving the confirmation information of the usage authorization request from the data owner, the system can process the original data based on the usage demand of the data requestor to obtain the processing result data of the data. The system can process the original data by selecting a corresponding processing method based on different demands of the data requestor, for example, statistical summation and calculation of an average value.

During processing of the original data, the original data can be transmitted, for processing, to a platform that is used to provide a secure C3S. The platform that is used to provide a secure C3S can be a C3S.

Privacy protection can be implemented by using various technologies, for example, cryptology technologies (such as Homomorphic encryption and Zero-knowledge proof), hardware privacy technologies, or network isolation technologies. A typical type of hardware privacy protection technology includes a trusted execution environment (TEE).

For example, blockchain nodes can implement a secure execution environment for blockchain transactions by using the TEE. The TEE is a trusted execution environment that is obtained through secure extension based on central processing unit (CPU) hardware and that is completely isolated from the outside world. Currently, the industry pays great attention to the TEE solution. Almost all mainstream chip and software alliances have respective TEE solutions, for example, the trusted platform module (TPM) for software, and the Intel software guard extensions (SGX), the ARM Trustzone, the AMD platform security processor (PSP) for hardware. The TEE can play a role of a hardware black box. Codes and data executed in the TEE cannot be peeked even at an operating system layer, and can be operated only by using pre-defined interfaces in the codes. In terms of efficiency, due to the black box property of the TEE, computation of plaintext data instead of complicated cryptology computation of homomorphic encryption is performed in the TEE, so there is almost no efficiency loss during computation. Therefore, deploying the TEE on the blockchain node can greatly satisfy the privacy demand in the blockchain scenario when there are relatively small performance losses, thereby protecting data privacy.

Processing the original data by using a confidential computing method can complete secure and trusted computation of the original data that serves as data assets while ensuring that the original data of the user is not leaked.

Step 208: The processing result data is transmitted to the data requestor.

Step 210: A verifiable claim (VC) used to record usage information of the original data is generated.

The VC records information that is used to indicate that the original data is used by the data requestor. In the system, the usage information of the original data is recorded and stored in the blockchain network. Specifically, the usage information of the original data can be stored in the form of the VC in the blockchain network.

In actual applications, the VC can specifically include information about the data requestor that uses the calculation result of the original data, a used data form of the original data (for example, a specific type of calculation result for use), a usage range of the calculation result of the original data, etc.

It should be understood that sequences of some steps of methods in some embodiments of the present specification can be exchanged based on actual needs, or some steps can be omitted or deleted.

In the method shown in FIG. 2, the usage demand of the original data that serves as data assets is obtained from the data requestor. The usage authorization request for the original data is submitted to the data owner of the original data based on the DID corresponding to the original data. After the confirmation information of the usage authorization request is received from the data owner, the original data is processed based on the usage demand to obtain the processing result data. The processing result data is transmitted to the data requestor. The VC used to record the usage information of the original data is generated. As such, it can be ensured that when the original data serving as the data assets is kept within a domain, transmission usage needs are satisfied, and a usage process of the processing result data obtained by processing the original data is clearly recorded, thereby ensuring that the data asset transfer process is secure and traceable.

Based on the method shown in FIG. 2, some embodiments of the present specification further provide some specific implementation solutions that are described below.

Optionally, before the usage demand information of the data requestor for the original data that serves as data assets is obtained, the method further includes the following:

belonging relationship information between the original data and the data owner is obtained;

binding relationship information between the data identifier of the original data and the DID of the data owner is established based on the belonging relationship information; and the binding relationship information is stored in a first blockchain system.

The blockchain technology has the following four major features:

(1) Decentralization: peer-to-peer transactions, coordination, and cooperation can be implemented without intervention of a third party. In the blockchain network, no institution or individual can perform overall data control, and overall operating of the system is not affected when any one of nodes stops working. The decentralized network can greatly enhance data security.

(2) Tamper-proofing: The blockchain verifies and stores data by using encryption technologies, and adds and updates data by using a decentralized consensus algorithm. The blockchain requires all nodes to participate in transaction verification and block mining. Modifications of any data require changes of all subsequent records, and it is very difficult to modify data on a single node.

(3) Openness, transparency, and traceability: Content written into a block is copied to all nodes, all nodes own the newest complete database copy, and all record information is open. Any person can query data in the block through an open interface. Each transaction in the blockchain is stored and solidified in block data through chained storage, and all transaction records in all blocks undergo superimposed hash digesting by using a cryptographic algorithm, so data of any historical transaction can be traced.

(4) Collective maintenance: Decentralization of the blockchain network determines the collective maintenance of the blockchain network. A conventional decentralized institution usually plays three roles: data storage, data management, and data analysis. The blockchain network is jointly maintained by all participants that play equivalent roles. All parties have clear rights and obligations, and do not need to transfer a right to a third-party institution, to implement joint cooperation.

The original data that serves as data assets can be stored in the blockchain based on decentralization, tamper-proofing, openness, transparency, and traceability of the blockchain.

A belonging relationship can indicate the data owner that the original data belongs to. Each original data belongs to a data owner. Each original data has a data identifier. The data owner also has a DID. The binding relationship information between the identifier of the original data and the DID of the data owner can be established based on the belonging relationship between the original data and the data owner. The binding relationship information is stored in the first blockchain system for convenient query.

Optionally, the step of obtaining belonging relationship information between the original data and the data owner can specifically include the following:

ownership confirmation information that includes a digital signature of a trusted organization is obtained, where the ownership confirmation information is used to indicate actual identity information of the data owner of the original data.

The step of establishing binding relationship information between the data identifier of the original data and the DID of the data owner can specifically include the following:

a DID corresponding to the actual identity information is searched for; and record information of the data identifier of the original data is added to a DID Doc corresponding to the DID.

The trusted organization can be an organization that has authority and can prove ownership of the data, for example, a bank, a credit reporting agency, or a social security service. The bank is used as an example. A system of the bank stores corresponding salary details of a user, and the salary details stamped with the official seal of the bank can prove validity and authenticity. Therefore, the ownership confirmation information that includes the digital signature of the trusted organization can be obtained when the belonging relationship information between the original data and the data owner is determined. The ownership confirmation information can be used to indicate the actual identity information of the data owner of the original data, and the ownership confirmation information can include identification information such as an identity card number and a name of the data owner. For example, for original data A, ownership confirmation information that includes a digital signature provided by trusted organization B is as follows: original data A belongs to Zhang San, and an identity card number is X.

The DID of the data owner can be determined after the actual identity information of the data owner is determined. The DID of the owner is stored in the DID Doc. When the binding relationship between the original data and the data owner is established, the record information of the data identifier of the original data can be added to the DID Doc that stores the DID of the data owner, to complete the binding relationship between the DID of the data owner and the data identifier of the original data.

The DID Doc can be used to store relevant information of the DID. The DID Doc can include the DID corresponding to the data owner, and a DID of one data owner can be correspondingly stored in one DID Doc. The DID Doc stored on the blockchain can be signed by using an asymmetric encryption algorithm, encrypted by using a private key, and decrypted and verified by using a public key.

It is worthwhile to note that in the embodiments of the present specification, a blockchain platform can provide a DIS. Specifically, the user can create an individual DID and an individual DID Doc by using the DIS used to manage an identity of the user. The DID and the DID Doc of the user can be both stored in the blockchain platform.

The DIS is a blockchain-based identity management solution. A DIS server can be connected to the blockchain platform, and provide functions such as creation, verification and management of a digital identity, thereby implementing standardized management and protection of entity data while ensuring authenticity and efficiency of information transfer.

In the embodiments of the present specification, the DIS can be used to establish the binding relationship between the data identifier of the original data and the DID of the data owner, can also be used to establish the binding relationship between the data identifier of processing result data and the DID of the data requestor, and store the binding relationships in the DID Doc.

Optionally, in the embodiments of the present specification, a plurality of methods for transmitting the processing result data to the data requestor can be provided.

Method 1

The processing result data is transmitted to the data requestor by using a second blockchain system.

In the previous method, the processing result data can be encrypted by using a public key of the data requestor during data transmission, and is transmitted to the data requestor after encryption. After receiving the processing result data, the data requestor can perform decryption by using a private key of the data requestor to obtain decrypted data, thereby preventing data from leaking during transmission.

Method 2

The processing result data is transmitted from a third blockchain system to a fourth blockchain system by using cross-chain transmissions, where the fourth blockchain system is a blockchain system accessed by the data requestor.

In some actual application scenarios, the blockchain system accessed by the data requestor may be different from a blockchain system accessed by the data owner. In this case, the data of the data owner can be transmitted to the data requestor by using cross-chain transmissions.

Method 3

The processing result data is transmitted to the data requestor by using off-chain transmissions.

In the method, off-chain authorization trusted transmission can be used, and a transmission relationship is stored on the blockchain.

In all the previous three transmission methods, the processing result data can be encrypted during transmission, to ensure security of the processing result data during transmission.

Optionally, the method can further include the following:

binding relationship information between the data identifier of the processing result data and the DID of the data owner is established; and the binding relationship information is stored in the first blockchain system.

It is worthwhile to note that the data owner can consider the processing result data obtained by processing the original data as newly added data assets of the data owner, store the processing result data in the blockchain system, and bind the processing result data to the DID of the data owner. As such, retrieving and recording newly added data assets of the data owner to the blockchain can be implemented. In addition, when a data requestor subsequently requests the processing result data, the processing result data of the data owner can be directly transmitted to the data requestor without repeated processing of the original data. Therefore, in actual applications, the binding relationship information between the data identifier of data for processing and the DID of the data owner can be established, and the binding relationship information is stored in the first blockchain system. The blockchain system also stores the binding relationship information between the data identifier of the original data and the DID of the data owner.

Optionally, the original data is stored in a fifth blockchain system, and the method can further include the following:

the processing result data is stored in the fifth blockchain system.

After processing the original data to obtain the processing result data, the system can transmit the processing result data to the data owner in addition to the data requestor. This is referred to as data retrieving. After the operation is performed, the data owner can also use the processing result data as data assets of the data owner, thereby increasing the data assets of the data owner. Therefore, when a data requestor subsequently requests the processing result data, the processing result data of the data owner can be directly transmitted to the data requestor without repeated processing of the original data.

In addition, it is worthwhile to note that "first, second, third, fourth, and fifth" in the "first blockchain system", the "first blockchain system", the "third blockchain system", the "fourth blockchain system", and the "fifth blockchain system" described in the previous embodiments do not have special meanings, but are merely used to specify blockchain systems to perform different functions. In actual applications, these blockchain systems can belong to the same blockchain system, or can be different blockchain systems. Embodiments are not specifically limited in the present specification.

Embodiment 2

Figure 3:
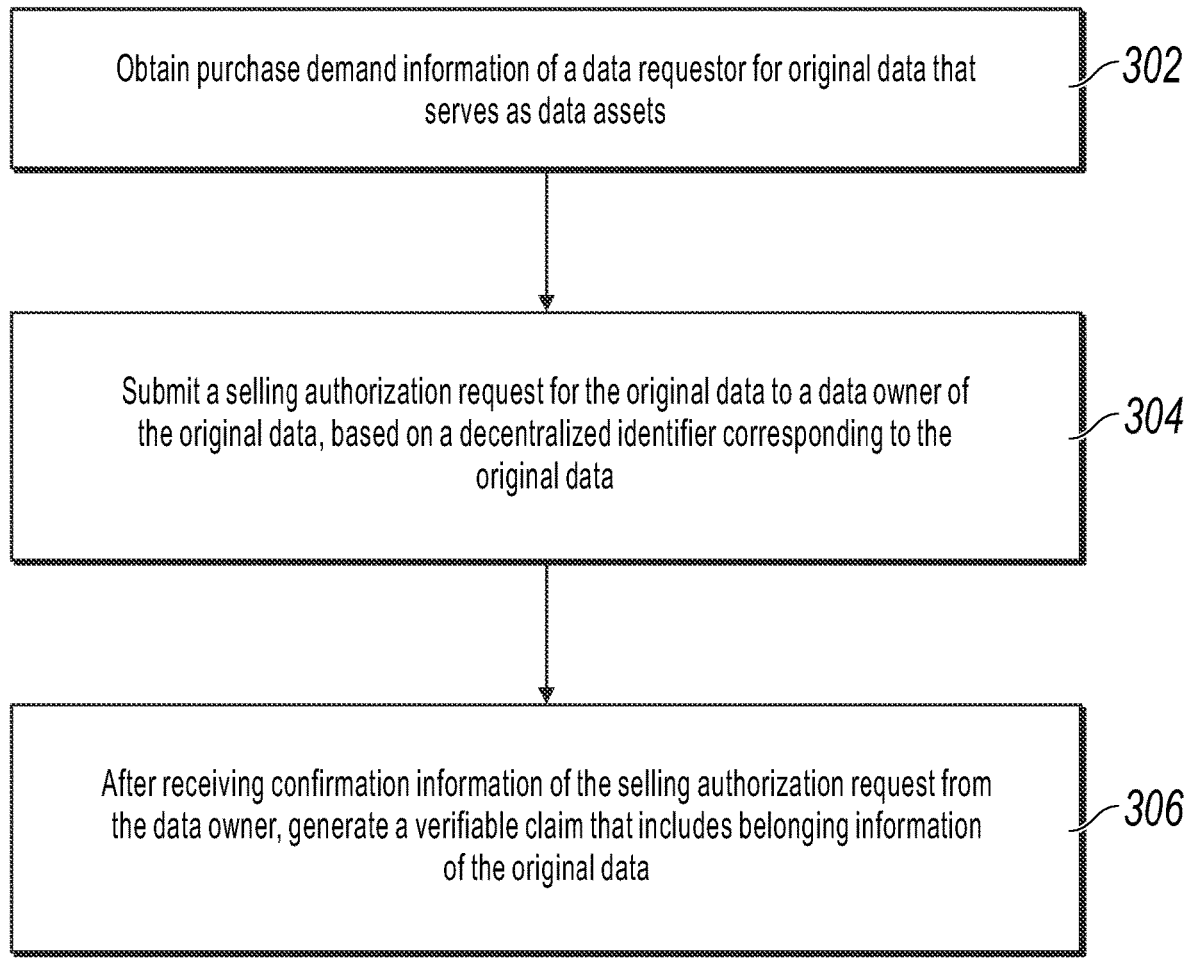
FIG. 3 is a flowchart illustrating a method for transferring data assets based on a blockchain, according to Embodiment 2 of the present specification.

FIG. 3 is a flowchart illustrating a method for transferring data assets based on a blockchain, according to Embodiment 2 of the present specification. In terms of a program, the process can be executed by a program or an application that is loaded on an application server or an application client device. The execution body in the present embodiment of the present specification can be the same as the execution body in Embodiment 1.

As shown in FIG. 3, the process can include the following steps:

Step 302: Purchase demand information of a data requestor for original data that serves as data assets is obtained.

The purchase demand information can be used to indicate a demand of the data requestor for purchasing the original data.

Step 304: A selling authorization request for the original data is submitted to a data owner of the original data based on a DID corresponding to the original data.

Step 306: After confirmation information of the selling authorization request is received from the data owner, a VC that includes ownership information of the original data is generated, where the ownership information is used to indicate that ownership of the original data belongs to the data requestor.

The ownership information of the original data can be the rights of the data owner to possess, use, benefit, dispose of, and independently dispose of the original data. The ownership is transferred when an owner of the original data agrees to sell the original data, and the ownership of the original data belongs to a requestor who purchases the original data.

It is worthwhile to note that the original data in the present embodiment can be trusted data stored in a trusted device. The data can be medical record data, pictures, videos, novel documents, etc. of an individual. The trusted device can be a trusted USB flash drive, a trusted memory, and other hardware. A novel that is written by a user and that is stored in the trusted USB flash drive is used as an example. The trusted USB flash drive can determine ownership of the novel.

Information stored in the trusted hardware cannot be tampered with, thereby ensuring trustworthiness of the original data stored in the trusted hardware. There is a unique binding relationship between the trusted hardware and the user. When the user needs to use the trusted hardware to manage a personal identity and data, the user can enter relevant information of the original data by using an application interface of an application corresponding to the trusted hardware.

Based on the method shown in FIG. 3, some embodiments of the present specification further provide some specific implementation solutions that are described below.

Optionally, the method in FIG. 3 further includes the following:

the original data is encrypted to obtain encrypted original data; and the encrypted original data is transmitted to the data requestor.

In the previous method, the original data can be encrypted to ensure security during data transmission. The original data can be encrypted by using a public key and decrypted by using a private key. In addition, a digital signature method can be used to encrypt the original data by using a private key and decrypt the original data by using a public key to ensure ownership of the digital signature. However, in some special application scenarios, the data owner can use a public key of the data owner to encrypt the data, and transmit a private key of the data owner to a corresponding data owner by using a secure method, so that the data owner can decrypt the data by using the private key of the data owner.

In actual application scenarios, the original data that serves as data assets needs to be unique and cannot be randomly duplicated. Therefore, the ownership of the original data needs to be transferred when the original data is sold. Once the original data is sold, the ownership of the original data is transferred from the data owner who sells the data to the data requestor who purchases the data.

The data owner agrees to sell the original data to the data requestor, and deletes the original data stored by the data owner after the original data is successfully transmitted to the data requestor. That is, the original data stored in a device of the data owner is deleted, and the data owner no longer has a corresponding right to use the original data, so that the ownership of the original data can be transferred.

Optionally, before the step of obtaining purchase demand information of a data requestor for original data that serves as data assets, the method can further include the following:

belonging relationship information between the original data and the data owner is obtained;

first binding relationship information between a data identifier of the original data and a DID of the data owner is established based on the belonging relationship information; and the first binding relationship information is stored in a first blockchain system.

Optionally, the step of obtaining belonging relationship information between the original data and the data owner can specifically include the following:

ownership confirmation information that includes a digital signature of a trusted organization is obtained, where the ownership confirmation information is used to indicate actual identity information of the data owner of the original data.

The step of establishing binding relationship information between a data identifier of the original data and a DID of the data owner can specifically include the following:

a DID corresponding to the actual identity information is searched for; and record information of the data identifier of the original data is added to a DID Doc corresponding to the DID.

Optionally, second binding relationship information between the data identifier of the original data and a DID of the data requestor is established after the confirmation information of the selling authorization request is received from the data owner; and the second binding relationship information is stored in the first blockchain system.

It is worthwhile to note that the binding relationship between the data identifier of the original data and the DID of the data owner is stored in the first blockchain system, and the binding relationship stored in the blockchain system cannot be deleted or modified due to the features of the blockchain. As such, after the original data is sold to the data requestor, the binding relationship between the data identifier of the original data and the data requestor is generated, and is also stored in the first blockchain system. In subsequent steps, the following steps can be performed if the ownership of the original data needs to be determined:

one or more pieces of binding relationship information of the identifier of the original data in the first blockchain system are obtained;

a storage time of each piece of binding relationship information is obtained;

binding relationship information with the most recent storage time is determined as actual binding relationship information of the original data; and identity information of an actual owner of the original data is determined based on the actual binding relationship information.

Optionally, the step of transmitting the encrypted original data to the data requestor can specifically include the following:

the encrypted original data is transmitted to the data requestor through a second blockchain system; or the encrypted original data is transmitted from a third blockchain system to a fourth blockchain system by using cross-chain transmissions, where the fourth blockchain system is a blockchain system accessed by the data requestor; or the encrypted original data is transmitted to the data requestor by using off-chain transmissions.

It is worthwhile to note that the step of transmitting the original data in Embodiment 1 is the same as the step of transmitting the processing result data in Embodiment 1, and the step of encrypting the original data is the same as the step of encrypting the processing result data in Embodiment 1. A difference lies in that the data transmitted in Embodiment 1 is the processing result data obtained by processing the original data, and the data transmitted in Embodiment 2 is the original data. Therefore, for the implementation method in Embodiment 2, references can be made to the implementation steps in Embodiment 1. Details are omitted in the present specification.

The method in Embodiment 2 can achieve the following technical effects:

1) The purchase demand information of the data requestor for the original data that serves as data assets is obtained. The selling authorization request for the original data is submitted to the data owner of the original data based on the DID corresponding to the original data. The VC that includes the ownership information of the original data is generated after the confirmation information of the selling authorization request is received from the data owner. In the previous method, the selling information of the original data can be recorded in the blockchain, and the selling process and the ownership transfer process of the original data can be both clearly recorded, thereby ensuring that the data asset transfer process is secure and traceable.

2) The processing result data can be encrypted by using the public key of the data requestor during data transmission, and is transmitted to the data requestor after encryption. After receiving the processing result data, the data requestor can perform decryption by using the private key of the data owner to obtain decrypted data to prevent data from being leaked during transmission.

3) The ownership of the original data needs to be transferred when the original data is sold. Once the original data is sold, the ownership of the original data is transferred from the data owner who sells the data to the data requestor who purchases the data, thereby ensuring uniqueness of the data assets and preventing the data assets from being tampered with and duplicated in any phase in the transfer process to destroy privacy.

4) After processing the original data to obtain the processing result data, the system can transmit the processing result data to the data owner in addition to the data requestor. After the operation is performed, the data owner can also use the processing result data as data assets of the data owner, thereby increasing the data assets of the data owner. Therefore, when a data requestor subsequently requests the processing result data, the processing result data of the data owner can be directly transmitted to the data requestor without repeated processing of the original data.

Figure 4:
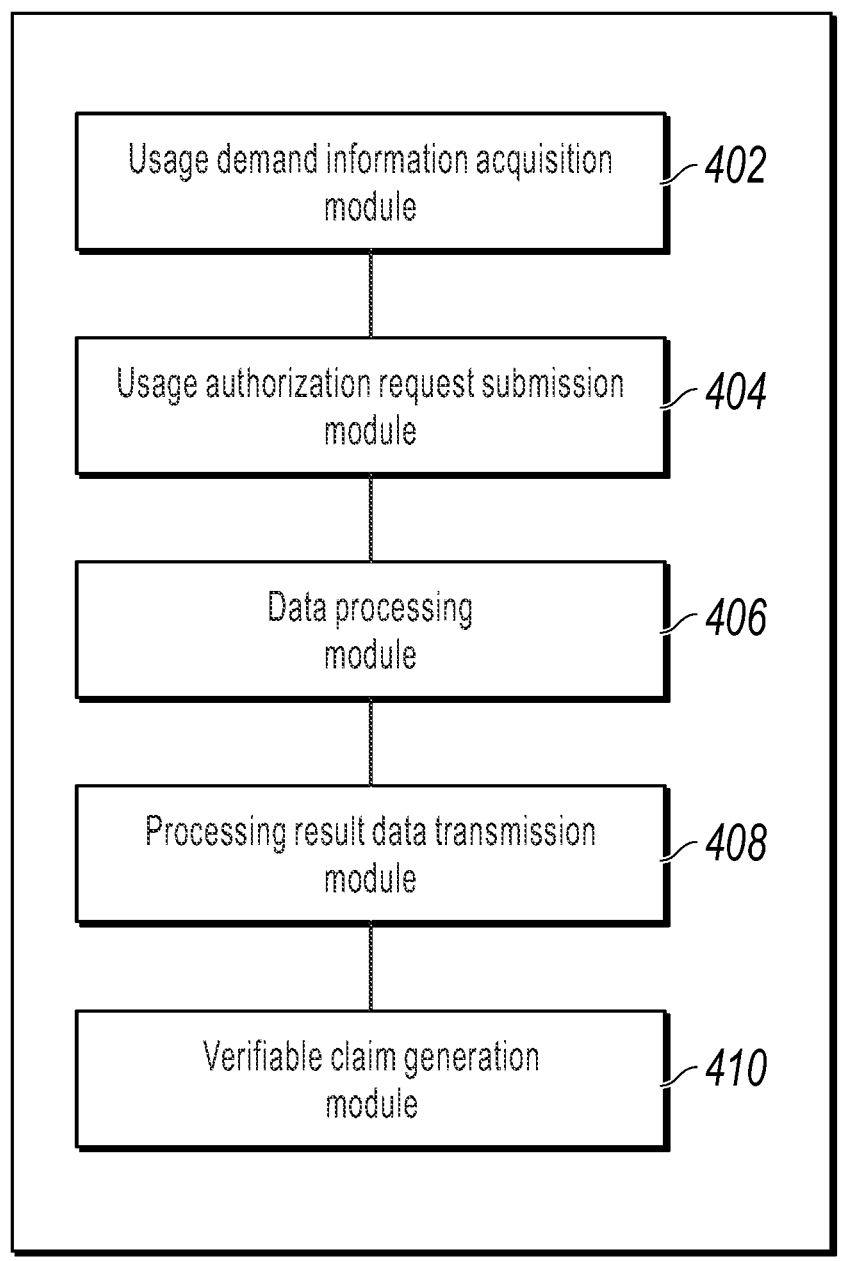
FIG. 4 is a schematic structural diagram illustrating an apparatus for transferring data assets based on a blockchain corresponding to FIG. 2, according to some embodiments of the present specification.

Embodiments of the present specification also provide an apparatus corresponding to the method in Embodiment 1 based on the same concept. FIG. 4 is a schematic structural diagram illustrating an apparatus for transferring data assets based on a blockchain corresponding to FIG. 2, according to some embodiments of the present specification. As shown in FIG. 4, the apparatus can include:

a usage demand information acquisition module 402, configured to obtain usage demand information of a data requestor for original data that serves as data assets, where the usage demand information is used to indicate the demand of the data requestor for obtaining a result calculated based the original data;

a usage authorization request submission module 404, configured to submit a usage authorization request for the original data to a data owner of the original data based on a DID corresponding to the original data;

a data processing module 406, configured to: after confirmation information of the usage authorization request is received from the data owner, process the original data based on the usage demand to obtain processing result data;

a processing result data transmission module 408, configured to transmit the processing result data to the data requestor; and a verifiable claim generation module 410, configured to generate a VC used to record usage information of the original data.

Based on the apparatus shown in FIG. 4, some embodiments of the present specification further provide some specific implementation solutions of the method that are described below.

Optionally, the apparatus can further include:

a belonging relationship information acquisition module, configured to obtain belonging information between the original data and the data owner;

a first binding relationship information establishment module, configured to establish binding relationship information between a data identifier of the original data and a DID of the data owner based on the belonging relationship information; and a first binding relationship information storage module, configured to store the binding relationship information in a first blockchain system.

Optionally, the belonging relationship information acquisition module can specifically include:

an ownership confirmation information acquisition unit, configured to obtain ownership confirmation information that includes a digital signature of a trusted organization, where the ownership confirmation information is used to indicate actual identity information of the data owner of the original data;

the binding relationship information establishment module can specifically include:

a decentralized identifier searching unit, configured to search for a DID corresponding to the actual identity information; and a record information adding unit, configured to add record information of the data identifier of the original data to a DID Doc corresponding to the DID.

Optionally, the data processing module 406 can specifically include:

a data processing unit, configured to transmit, for processing, the original data to a platform used to provide a secure C3S.

Optionally, the processing result data transmission module 408 can be specifically configured to:

transmit the processing result data to the data requestor through a second blockchain system; or transmit the processing result data from a third blockchain system to a fourth blockchain system by using cross-chain transmissions, where the fourth blockchain system is a blockchain system accessed by the data requestor; or transmit the processing result data to the data requestor by using off-chain transmissions.

Optionally, the apparatus can further include:

a second binding relationship information establishment module, configured to establish binding relationship information between a data identifier of the processing result data and the DID of the data owner; and a second binding relationship information storage module, configured to store the binding relationship information in the first blockchain system.

Optionally, the original data is stored in a fifth blockchain system, and the apparatus can further include:

a processing result data storage module, configured to store the processing result data in the fifth blockchain system.

Figure 5:
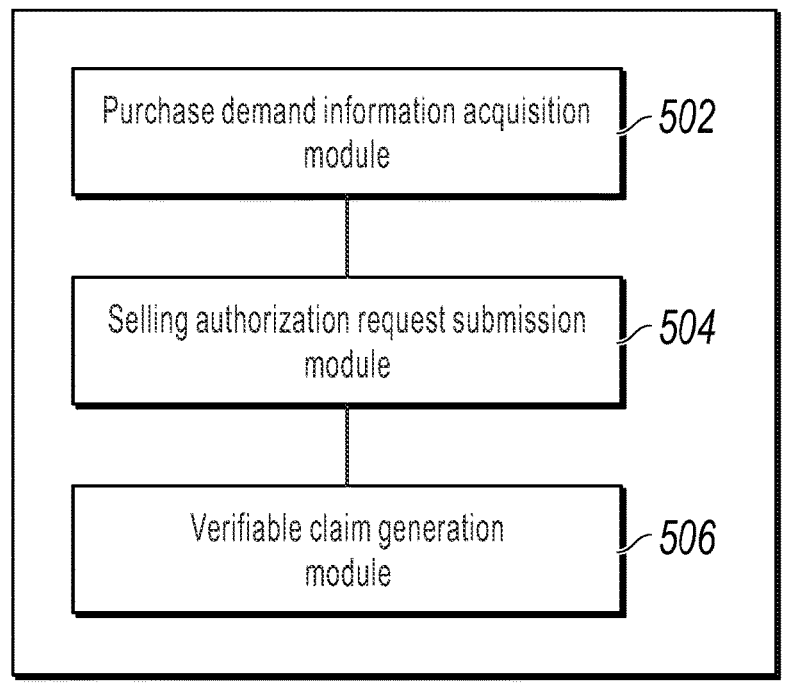
FIG. 5 is a schematic structural diagram illustrating an apparatus for transferring data assets based on a blockchain corresponding to FIG. 3, according to some embodiments of the present specification.

Embodiments of the present specification also provide an apparatus corresponding to the method in Embodiment 2 based on the same concept. FIG. 5 is a schematic structural diagram illustrating an apparatus for transferring data assets based on a blockchain corresponding to FIG. 3, according to some embodiments of the present specification. As shown in FIG. 5, the apparatus can include:

a purchase demand information acquisition module 502, configured to obtain purchase demand information of a data requestor for original data that serves as data assets;

a selling authorization request application module 504, configured to submit a selling authorization request for the original data to a data owner of the original data based on a DID corresponding to the original data; and a verifiable claim generation module 506, configured to: after confirmation information of the selling authorization request is received from the data owner, generate a VC that includes ownership information of the original data, where the ownership information is used to indicate that ownership of the original data belongs to the data requestor.

Based on the apparatus shown in FIG. 5, some embodiments of the present specification further provide some specific implementation solutions of the method that are described below.

Optionally, the apparatus can further include:

an encryption module, configured to encrypt the original data to obtain encrypted original data; and, an original data transmission module, configured to transmit the encrypted original data to the data requestor.

Optionally, the apparatus can further include:

an original data deletion module, configured to: after the original data is successfully transmitted to the data requestor, delete the original data stored by the data owner.

Optionally, the apparatus can further include:

a belonging relationship information acquisition module, configured to obtain belonging relationship information between the original data and the data owner;

a first binding relationship information determining module, configured to establish first binding relationship information between a data identifier of the original data and a DID of the data owner based on the belonging relationship information; and a first binding relationship storage module, configured to store the first binding relationship information in a first blockchain system.

Optionally, the belonging relationship information acquisition module can specifically include:

an ownership confirmation information acquisition unit, configured to obtain ownership confirmation information that includes a digital signature of a trusted organization, where the ownership confirmation information is used to indicate actual identity information of the data owner of the original data.

The first binding relationship information establishment module specifically includes:

a decentralized identifier searching unit, configured to search for a DID corresponding to the actual identity information; and a record information adding unit, configured to add record information of the data identifier of the original data to a DID Doc corresponding to the DID.

Optionally, the apparatus can further include:

a second binding relationship information establishment module, configured to: after confirmation information of the selling authorization request is received from the data owner; establish second binding relationship information between the data identifier of the original data and a DID of the data requestor; and a second binding relationship information storage module, configured to store the second binding relationship information in the first blockchain system.

Optionally, the original data transmission module can be specifically configured to:

transmit the encrypted original data to the data requestor through a second blockchain system; or transmit the encrypted original data from a third blockchain system to a fourth blockchain system by using cross-chain transmissions, where the fourth blockchain system is a blockchain system accessed by the data requestor; or transmit the encrypted original data to the data requestor by using off-chain transmissions.

Embodiments of the present specification also provide a device corresponding to the previous method.

Figure 6:
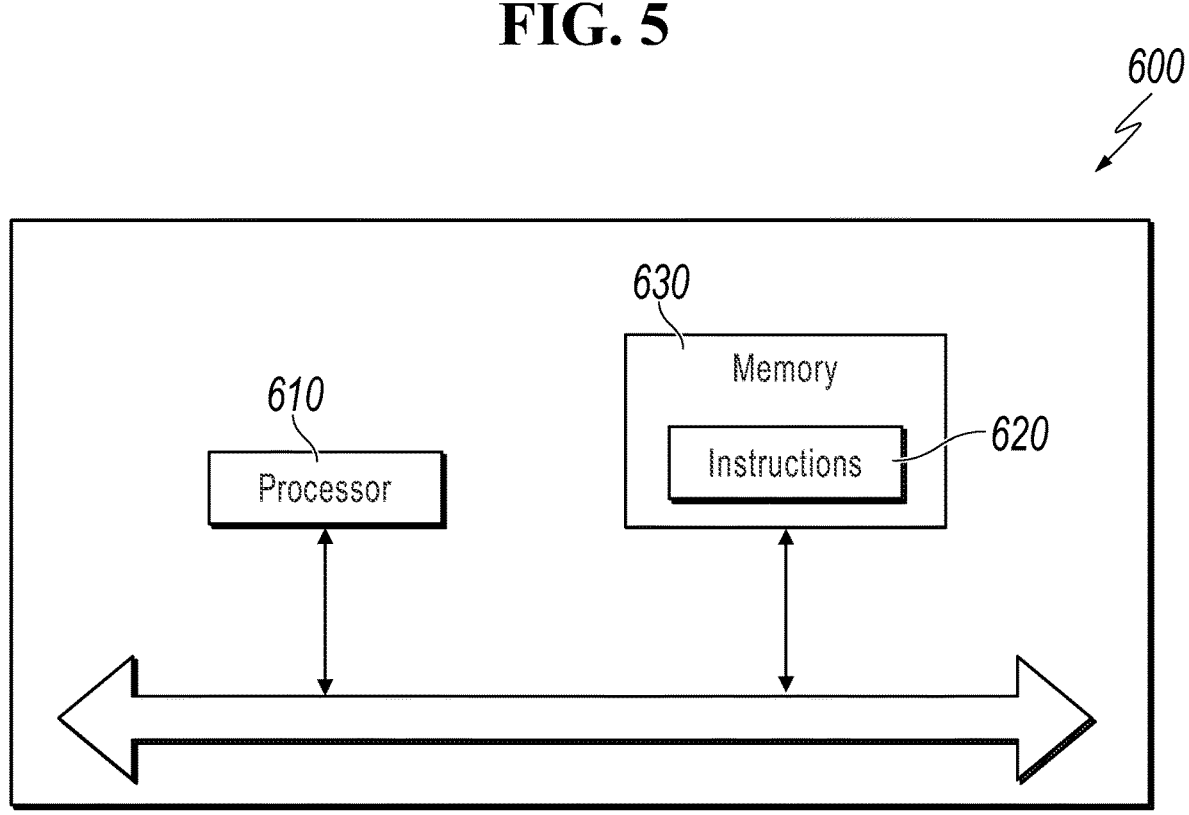
FIG. 6 is a schematic structural diagram illustrating a device for transferring data assets based on a blockchain, according to some embodiments of the present specification.

FIG. 6 is a schematic structural diagram illustrating a device for transferring data assets based on a blockchain, according to some embodiments of the present specification. As shown in FIG. 6, the device 600 can include:

at least one processor 610; and a memory 630 communicatively coupled to the at least one processor.

The memory 630 stores instructions 620 that can be executed by the at least one processor 610, and the instructions are executed by the at least one processor 610.

Corresponding to Embodiment 1, according to the device for transferring data assets based on a blockchain, the instructions 620 can enable the at least one processor 610 to:

obtain usage demand information of a data requestor for original data that serves as data assets, where the usage demand information is used to indicate a demand of a data requestor for obtaining a result calculated based on the original data;

submit a usage authorization request for the original data to a data owner of the original data based on a DID corresponding to the original data;

after receiving confirmation information of the usage authorization request from the data owner, process the original data based on the usage demand to obtain processing result data;

transmit the processing result data to the data requestor; and generate a VC used to record usage information of the original data.

Corresponding to Embodiment 2, according to the device for transferring data assets based on a blockchain, the instructions 620 can enable the at least one processor 610 to:

obtain purchase demand information of a data requestor for original data that serves as data assets;

submit a selling authorization request for the original data to a data owner of the original data based on a DID corresponding to the original data; and after receiving confirmation information of the selling authorization request from the data owner, generate a VC that includes ownership information of the original data, where the ownership information is used to indicate that ownership of the original data belongs to the data requestor.

Embodiments of the present specification also provide a computer readable medium corresponding to the method in Embodiment 1 based on the same concept. The computer readable medium stores computer readable instructions, and the computer readable instructions can be executed by a processor to implement the following method:

usage demand information of a data requestor for original data that serves as data assets is obtained, where the usage demand information is used to indicate a demand of a data requestor for obtaining a result calculated based on the original data;

a usage authorization request for the original data is submitted to a data owner of the original data based on a DID corresponding to the original data;

after confirmation information of the usage authorization request is received from the data owner, the original data is processed based on the usage demand to obtain processing result data;

the processing result data is transmitted to the data requestor; and a VC used to record usage information of the original data is generated.

Embodiments of the present specification also provide a computer readable medium corresponding to the method in Embodiment 2 based on the same concept. The computer readable medium stores computer readable instructions, and the computer readable instructions can be executed by a processor to implement the following method:

purchase demand information of a data requestor for original data that serves as data assets is obtained;

a selling authorization request for the original data is submitted to a data owner of the original data based on a DID corresponding to the original data; and after confirmation information of the selling authorization request is received from the data owner, a VC that includes ownership information of the original data is generated, where the ownership information is used to indicate that ownership of the original data belongs to the data requestor.

The embodiments in the present specification are described in a progressive way. For same or similar parts of the embodiments, mutual references can be made to the embodiments. Each embodiment focuses on a difference from other embodiments. In particular, as shown in FIG. 6, the devices for transferring data assets based on a blockchain are similar to method embodiments, and therefore are simply described. For relevant parts, mutual references can be made to the method embodiments.

In the 1990s, the improvement on a technology can be clearly distinguished between hardware improvements (for example, improvements on circuit structures such as diodes, transistors and switches) or software improvements (improvements on method processes). However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer "integrates" a digital system to a single PLD through self-programming, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method process can be readily obtained provided that the method process is logically programmed by using several of the previously described hardware description languages and is programmed into an integrated circuit.

A controller can be implemented in any appropriate way. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can be further implemented as a part of control logic of a memory. A person skilled in the art also knows that, in addition to implementing the controller by using the computer-readable program code, method steps can be logically programmed to enable the controller to implement the same function in forms of a logic gate, a switch, an application-specific integrated circuit, a programmable logic controller, and a built-in microcontroller. Therefore, such a controller can be considered as a hardware component, and an apparatus that is included in the controller and configured to implement various functions can also be considered as a structure in the hardware component. Alternatively, the apparatus configured to implement various functions can even be considered as both a software module implementing a method and a structure in the hardware component.

The system, apparatus, module, or unit illustrated in the above embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is divided to various units based on functions for description when the previous apparatus is described. Certainly, when the one or more embodiments of the present specification is implemented, functions of the units can be implemented in one or more pieces of software and/or hardware.

A person skilled in the art should understand that the embodiments of the present disclosure can be provided as a method, a system, or a computer program product. Therefore, the one or more embodiments of the present disclosure can be in a form of hardware only embodiments, software only embodiments, or embodiments with a combination of software and hardware. In addition, the one or more embodiments of the present disclosure can be in a form of a computer program product that is implemented on one or more computer-usable storage media (including but not limited to a magnetic disk memory, a CD-ROM, an optical memory, etc.) that include computer-usable program code.

The embodiments of the present disclosure are described with reference to the flowcharts and/or block diagrams of the method, the device (system), and the computer program product according to the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

Alternatively, these computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more processors (CPUs), input/output interfaces, network interfaces, and memories.

The memory may include at least one of a non-persistent memory, a random access memory (RAM) or a nonvolatile memory in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be computer-readable instructions, data structures, program modules, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to a computing device. As described in the present specification, the computer-readable medium does not include computer-readable transitory media such as a modulated data signal and a carrier.

It is worthwhile to note that the terms "comprise", "include", or any other variation thereof are intended to cover a non-exclusive inclusion, so that a process, a method, a product, or a device that includes a list of elements includes those elements and further includes other elements not expressly listed or inherent to such a process, method, article, or device. In the absence of more restrictions, elements described by the phrase "include a/an . . . " do not exclude the existence of additional identical elements in the process, method, product, or device that includes the elements.

A person skilled in the art should understand that the embodiments of the present application can be provided as methods, systems or computer program products. Therefore, the embodiments of the present application can adopt forms of complete hardware embodiments, complete software embodiments or embodiments integrating software and hardware. Moreover, the present application can adopt the form of a computer program product implemented on one or more computer available storage media (including, but not limited to, a disk memory, a CD-ROM, an optical memory, etc.) containing computer available program code.

The present application can be described in the general context of computer executable instructions, such as program modules, executed by a computer. Generally, the program modules include routines, programs, objects, components, data structures, etc. that perform particular tasks or implement particular abstract data types. The present application can also be practiced in distributed computing environments where tasks are performed by remote processing devices that are connected through a communications network. In the distributed computing environments, the program modules can be located in both local and remote computer storage media including storage devices.

The previously described descriptions are only embodiments of the present application, and are not intended to limit the present application. A person skilled in the art can make various modifications and changes to the present specification. Any modifications, equivalent substitutions, improvements, etc. that come within the spirit and principles of the present application are intended to be included within the scope of the claims of the present application.

What is claimed is:

1. A computer-implemented method, comprising:
generating correspondence information between a data identifier of original data and a decentralized identifier (DID) of a data owner of the original data;
obtaining, by a blockchain node, usage demand information, from a data requestor, for using the original data, wherein the usage demand information indicates a demand of the data requestor for performing computations based on the original data;

identifying a plurality of pieces of correspondence information associated with the data identifier of original data, wherein each piece of the plurality of pieces of correspondence information is associated with a corresponding storage time;

determining, as actual binding relationship information, the correspondence information having a most recent storage time among the plurality of pieces of correspondence information;

identifying the data owner of the original data based on the actual binding relationship information;

sending, by the blockchain node, a usage authorization request for the original data to the data owner of the original data;

receiving confirmation information of the usage authorization request from the data owner;

processing, by the blockchain node, the original data based on the usage demand information to obtain a processing result, wherein the original data is processed in a trusted execution environment (TEE) deployed on the blockchain node;

transmitting the processing result to the data requestor;

generating a verifiable claim (VC) for recording usage information of the original data, wherein the VC indicates that the original data is used by the data requestor;

recording the VC on a blockchain;

generating a binding relationship between a data identifier of the processing result and the DID; and storing the binding relationship on the blockchain, wherein the binding relationship allows the processing result to be transmitted to an additional data requestor without repeated processing of the original data.

2. The computer-implemented method of claim 1, comprising:

in response to determining that the original data belongs to the data owner, generating the correspondence information between the data identifier of the original data and the DID of the data owner; and storing the correspondence information on the blockchain.

3. The computer-implemented method of claim 2, wherein determining that the original data belongs to the data owner comprises:

obtaining ownership confirmation information that comprises a digital signature of a trusted entity, wherein the ownership confirmation information indicates identity information of the data owner of the original data; and wherein generating the correspondence information between the data identifier of the original data and the DID of the data owner comprises:

searching for a DID corresponding to the identity information of the data owner; and adding the data identifier of the original data to a DID document corresponding to the DID.

4. The computer-implemented method of claim 1, wherein processing the original data comprises:

transmitting the original data to a platform that supports a secure confidential computing cloud service (C3S).

5. The computer-implemented method of claim 1, wherein transmitting the processing result to the data requestor comprises:

transmitting the processing result to the data requestor through at least one of blockchain transmissions, cross-chain transmissions, or off-chain transmissions.

6. The computer-implemented method of claim 1, wherein the blockchain is a second blockchain and the original data is stored in a first blockchain, and comprising:

storing the processing result in the first blockchain.

7. A non-transitory, computer-readable medium storing one or more instructions executable by a computer system to perform operations comprising:

generating correspondence information between a data identifier of original data and a decentralized identifier (DID) of a data owner of the original data;

obtaining, by a blockchain node, usage demand information, from a data requestor, for using the original data, wherein the usage demand information indicates a demand of the data requestor for performing computations based on the original data;

identifying a plurality of pieces of correspondence information associated with the data identifier of original data, wherein each piece of the plurality of pieces of correspondence information is associated with a corresponding storage time;

determining, as actual binding relationship information, the correspondence information having a most recent storage time among the plurality of pieces of correspondence information;

identifying the data owner of the original data based on the actual binding relationship information;

sending, by the blockchain node, a usage authorization request for the original data to the data owner of the original data;

receiving confirmation information of the usage authorization request from the data owner;

processing, by the blockchain node, the original data based on the usage demand information to obtain a processing result, wherein the original data is processed in a trusted execution environment (TEE) deployed on the blockchain node;

transmitting the processing result to the data requestor;

generating a verifiable claim (VC) for recording usage information of the original data, wherein the VC indicates that the original data is used by the data requestor;

recording the VC on a blockchain;

generating a binding relationship between a data identifier of the processing result and the DID; and storing the binding relationship on the blockchain, wherein the binding relationship allows the processing result to be transmitted to an additional data requestor without repeated processing of the original data.

8. The non-transitory, computer-readable medium of claim 7, the operations comprising:

in response to determining that the original data belongs to the data owner, generating the correspondence information between the data identifier of the original data and the DID of the data owner; and storing the correspondence information on the blockchain.

9. The non-transitory, computer-readable medium of claim 8, wherein determining that the original data belongs to the data owner comprises:

obtaining ownership confirmation information that comprises a digital signature of a trusted entity, wherein the ownership confirmation information indicates identity information of the data owner of the original data; and wherein generating the correspondence information between the data identifier of the original data and the DID of the data owner comprises:

searching for a DID corresponding to the identity information of the data owner; and
adding the data identifier of the original data to a DID document corresponding to the DID.

10. The non-transitory, computer-readable medium of claim 7, wherein processing the original data comprises:
transmitting the original data to a platform that supports a secure confidential computing cloud service (C3S).

11. The non-transitory, computer-readable medium of claim 7, wherein transmitting the processing result to the data requestor comprises:
transmitting the processing result to the data requestor through at least one of blockchain transmissions, cross-chain transmissions, or off-chain transmissions.

12. The non-transitory, computer-readable medium of claim 7, wherein the blockchain is a second blockchain and the original data is stored in a first blockchain, and the operations comprising:
storing the processing result in the first blockchain.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
generating correspondence information between a data identifier of original data and a decentralized identifier (DID) of a data owner of the original data;
obtaining, by a blockchain node, usage demand information, from a data requestor, for using the original data, wherein the usage demand information indicates a demand of the data requestor for performing computations based on the original data;
identifying a plurality of pieces of correspondence information associated with the data identifier of original data, wherein each piece of the plurality of pieces of correspondence information is associated with a corresponding storage time;
determining, as actual binding relationship information, the correspondence information having a most recent storage time among the plurality of pieces of correspondence information;
identifying the data owner of the original data based on the actual binding relationship information;
sending, by the blockchain node, a usage authorization request for the original data to the data owner of the original data;
receiving confirmation information of the usage authorization request from the data owner;
processing, by the blockchain node, the original data based on the usage demand information to obtain a processing result, wherein the original data is processed in a trusted execution environment (TEE) deployed on the blockchain node;
transmitting the processing result to the data requestor;
generating a verifiable claim (VC) for recording usage information of the original data, wherein the VC indicates that the original data is used by the data requestor;
recording the VC on a blockchain;
generating a binding relationship between a data identifier of the processing result and the DID; and
storing the binding relationship on the blockchain, wherein the binding relationship allows the processing result to be transmitted to an additional data requestor without repeated processing of the original data.

14. The computer-implemented system of claim 13, the operations comprising:
in response to determining that the original data belongs to the data owner, generating the correspondence information between the data identifier of the original data and the DID of the data owner; and
storing the correspondence information on the blockchain.

15. The computer-implemented system of claim 14, wherein determining that the original data belongs to the data owner comprises:
obtaining ownership confirmation information that comprises a digital signature of a trusted entity, wherein the ownership confirmation information indicates identity information of the data owner of the original data; and wherein
generating the correspondence information between the data identifier of the original data and the DID of the data owner comprises:
searching for a DID corresponding to the identity information of the data owner; and
adding the data identifier of the original data to a DID document corresponding to the DID.

16. The computer-implemented system of claim 13, wherein processing the original data comprises:
transmitting the original data to a platform that supports a secure confidential computing cloud service (C3S).

* * * * *